July 2, 1940.  F. G. HUGHES  2,206,323
AXLE AND BEARING CONSTRUCTION
Filed Jan. 24, 1939
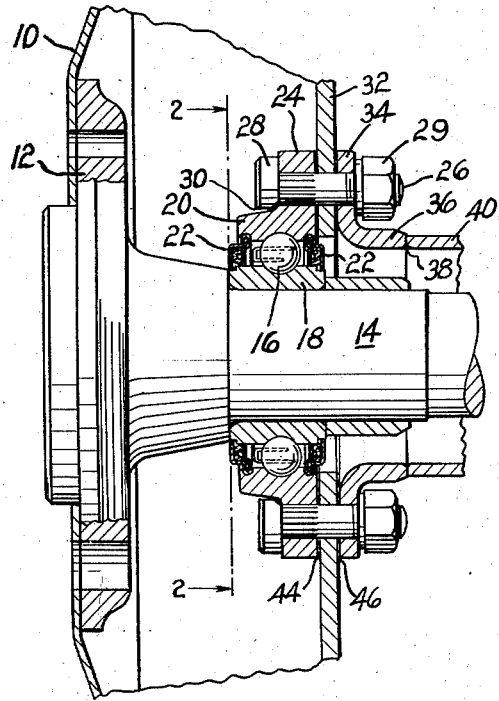
Fig. 1
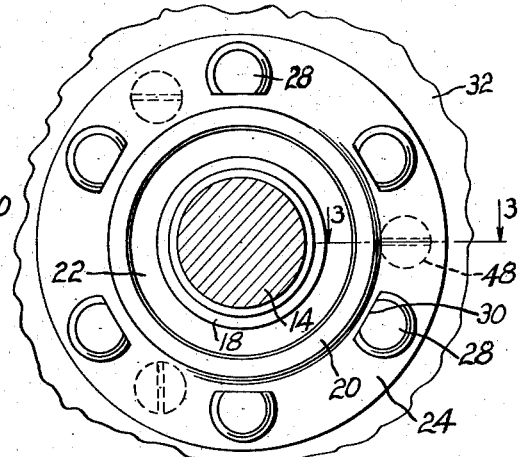
Fig. 2
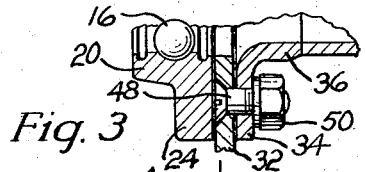
Fig. 3
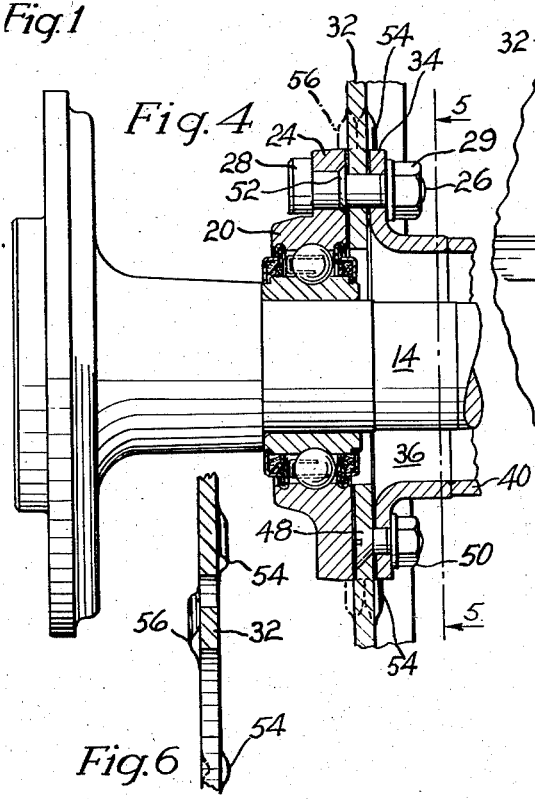
Fig. 4
Fig. 6
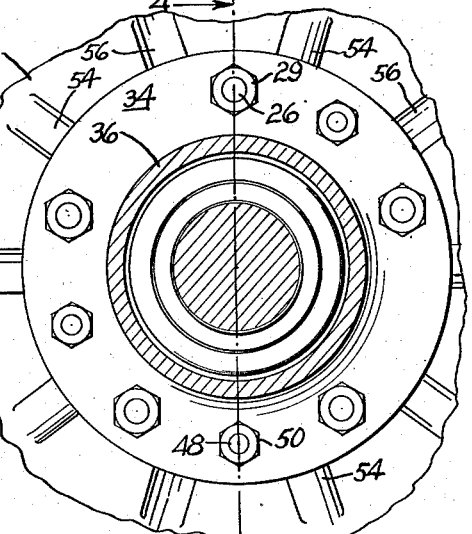
Fig. 5
INVENTOR:
FREDERICK G. HUGHES,
BY
Gales P. Moore
HIS ATTORNEY.

Patented July 2, 1940

2,206,323

UNITED STATES PATENT OFFICE 2,206,323

AXLE AND BEARING CONSTRUCTION

Frederick G. Hughes, Bristol, Conn., assignor to General Motors Corporation, Detroit, Mich., a corporation of Delaware Application January 24, 1939, Serial No. 252,623

12 Claims. (Cl. 308—191)

This invention relates to bearing mountings and comprises all of the features and aspects of novelty herein disclosed. An object of the invention is to provide an improved construction for mounting a shaft with respect to a housing, especially a drive shaft in the semi-floating type of rear axle housing. Another object is to provide a simple bearing mounting for a drive shaft and one that has advantageous features pertaining especially to economy in production, to ease of assembly and dismounting, and to efficiency in preventing lubricant leakage.

To these ends and also to improve generally upon devices of the character indicated, the invention consists in the various matters hereinafter described and claimed.

Fig. 1 is a longitudinal sectional view showing a construction adjacent to the outer portion of a motor vehicle rear axle.

Fig. 2 is a cross section taken on the line 2—2 of Fig. 1.

Fig. 3 is a cross section taken on the line 3—3 of Fig. 2.

Fig. 4 is a view similar to Fig. 1 of a modification, the section being taken on line 4—4 of Fig. 5.

Fig. 5 is a cross sectional view taken on line 5—5 of Fig. 4.

Fig. 6 is a sectional view of a portion of the brake anchor plate, the section being taken on line 4—4 of Fig. 5.

The numeral 10 indicates a portion of a road wheel which is adapted to be secured to a flange 12 on a drive shaft or axle 14 pertaining to the semi-floating type of automobile rear axles. The shaft is journalled in an antifriction bearing comprising rolling elements 16 in the form of balls running in grooved raceways of an inner race ring 18 and an angular outer race ring 20. The inner race ring is tightly secured upon the drive shaft against a shoulder and the outer race ring is provided with suitable grease seals 22 to retain bearing grease.

The outer race ring has an integral, outwardly extending holding flange 24 provided with a series of bolt holes for bolts 26 having heads 28 and nuts 29. The shanks of the bolts preferably have serrations where they are forced through the bolt holes in the flange 24 to thereby hold the bolts attached to the bearing to handle as a unit therewith. The heads 28 of the bolts are slabbed off as at 30 just outside of a peripheral portion of the race ring 20 to insure against rotation of the bolts when the nuts are set up tight. The bolts pass through a disc or brake anchor plate 32 and through an outwardly extending terminal flange 34 on an angle member 36 of tubular form which is conveniently welded along a joint 38 in concentric alignment with a tubular axle housing 40 to form a part thereof.

When the nuts 29 are set up, the bearing flange 24 is rigidly clamped against the outer side face of the anchor plate 32 and the latter is forced against the flange 34. To avoid leakage of gear lubricant from the axle housing, it is desirable to insert annular gaskets 44 and 46 between the flat side faces of the anchor plate and the adjacent flanges. The seals 22 besides retaining bearing grease prevent leakage of gear lubricant through the bearing itself. The brake anchor plate is clamped between the spaced confronting flanges 24 and 34 by the bolts but is independently secured to the flange 34 by screw bolts 48 and nuts 50 as indicated in Figs. 2 and 3, the heads of the screws being countersunk in the anchor plate. Upon removing the nuts 29 which are directly accessible at the inner or differential side of the anchor plate and the flange 34, the drive shaft, bearing and bolts can be detached and withdrawn as a unit without disconnecting the brake anchor plate or disturbing the oil lines or other brake parts thereon.

In the modification shown in Figs. 4, 5 and 6, the bolt holes in the holding flange 24 are countersunk and portions 52 of the bolts 26 are upset or riveted therein. To relieve the bolts of shearing stresses imposed by the weight of the vehicle and to insure concentricity of bearing and housing, the brake anchor plate 32 is piloted or centered upon both of the flanges 24 and 34. For this purpose, two circular series of offset lugs or projections 54 and 56 are bent or extruded from the anchor plate concentric with the bolt holes. The projections 54 extend laterally from the inner side of the plate and are piloted upon the flange 34. The projections 56 alternate with the projections 54 and extend laterally from the outer side of the plate to be piloted upon and conform to the flange 24.

The bearing is a precision product and the periphery of its flange 24 is circular and concentric with its circular series of bolt holes. The circles in which the arcuate edges of the projections lie are of the same diameter as the flanges 24 and 34. The flanges 34 are concentric with their bolt holes. Thus the bearing and the anchor plate are assured of accurate and concentric mounting on the axle housing and the assembly is very economical withal. The angle members 36 can be cheaply yet accurately produced in a punch press, each flange being trimmed off concentric with its bolt holes before the angle member is welded to the housing 40. This avoids handling of the entire housing and swinging it end for end to machine internal or external seats at opposite ends, as in prior constructions. The expense of machining these prior internal seats for packings and to receive ordinary bearings and of making separate caps to clamp the bearings in the seats is avoided. Such clamping tends to distort the bearings and this bad effect is eliminated. In such prior constructions, in spite of packings seated peripherally in the housing seats and engaging the rotating shaft, gear lubricant is prone to leak out between each bearing and its peripheral seat and past the clamping cap to the detriment of the brakes. In the present construction, on the other hand, the flat face contact of the clamped members with elimination of bearing seats prevents leakage around the bearing periphery. The bearing is rigidly supported yet can be readily detached with the drive shaft and remains protected when so withdrawn. The axle housing 40 can be made of small diameter because it is unnecessary to place the bearings inside of it or in enlargements thereof and this is conducive to economy.

I claim:

1. In a device of the character described, a bearing having its outer race ring provided with a terminal flange, a shaft journalled in the bearing, a tubular housing of smaller diameter than the race ring, the housing surrounding the shaft and having an outwardly extending flange, means for securing the flanges together, and means externally engaging the flanges to effect support of one from the other; substantially as described.

2. In a device of the character described, a bearing having its outer race ring provided with a terminal flange, a shaft journalled in the bearing, a tubular housing of smaller diameter than the race ring, the housing surrounding the shaft and having an outwardly extending flange, the ends of the flanges forming peripheral seats, a plate having lateral projections engaging the seats to effect support of one from the other, and means for securing the flanges together.

3. In a device of the character described, a bearing having its outer race ring provided with a terminal flange, a shaft journalled in the bearing, a tubular housing of smaller diameter than the race ring, an angle member of tubular form having an inner portion secured in abutting relation to the end of the housing and a flange projecting outwardly therefrom, and means for securing the flanges together; substantially as described.

4. In a semi-floating axle construction, an axle housing having a tubular portion and an angular member welded thereto to provide a terminal flange, an antifriction bearing beyond the flange, a drive shaft journalled in the bearing, the outer race ring of the bearing being of larger diameter than the tubular portion of the housing and having a flange confronting the flange of the housing, and means for securing the flanges in concentric relation; substantially as described.

5. In a semi-floating axle construction, an axle housing having a flange, a drive shaft, an antifriction bearing beyond the flange and having its inner race ring mounted on the shaft, the outer race ring of the bearing having a flange confronting the flange of the housing, and a member clamped between the flanges and having means to center one flange with respect to the other; substantially as described.

6. In a semi-floating axle construction, an axle housing, a drive shaft, an antifriction bearing having its inner race ring mounted on the shaft, the outer race ring of the bearing being spaced from the end of the axle housing, an anchor plate extending between the outer race ring and the end of the axle housing, means for clamping the anchor plate between said parts, and the anchor plate having load sustaining projections piloted upon the outer race ring; substantially as described.

7. In a semi-floating axle construction, an axle housing having a flange, a drive shaft, an antifriction bearing beyond the end of the axle housing and having its inner race ring mounted on the shaft, the outer race ring of the bearing having a terminal flange spaced from the housing flange, an anchor plate extending between said flanges, bolts for clamping said flanges against opposite sides of the anchor plate, and the anchor plate having load sustaining projections piloted upon said flanges to locate the bearing and relieve the bolts of load; substantially as described.

8. In a semi-floating axle construction, an axle housing, a drive shaft, an antifriction bearing having its inner race ring mounted on the shaft, the outer race ring of the bearing being spaced from the end of the axle housing, an anchor plate extending between the outer race ring and the end of the axle housing, means for clamping the anchor plate between said parts, and the anchor plate having two series of oppositely extending projections extruded therefrom and piloted upon the outer race ring and the axle housing; substantially as described.

9. In a semi-floating axle construction, an axle housing having a flange, a drive shaft, an antifriction bearing on the shaft, the outer race ring of the bearing being angular to provide a terminal holding flange, an anchor plate between the flanges, and means accessible at the inner side of the anchor plate for releasably clamping the bearing flange against the anchor plate; substantially as described.

10. In a semi-floating axle construction, an axle housing, a wheel, a drive shaft for the wheel, an antifriction bearing beyond the end of the axle housing and having its inner race ring mounted on the shaft, a brake anchor plate, means for securing the anchor plate to the end of the axle housing, the outer race ring of the bearing being angular to provide a rigid holding flange at the outer side of the anchor plate, and means accessible at the inner side of the anchor plate for detachably securing the race ring flange to the anchor plate to provide for withdrawal of the drive shaft and the bearing as a unit without disconnecting the anchor plate from the axle housing; substantially as described.

11. In a semi-floating axle construction, an axle housing, a drive shaft, an antifriction bearing beyond the end of the axle housing and having its inner race ring mounted on the shaft, an anchor plate, means for securing the anchor plate to the end of the axle housing, the outer race ring of the bearing being located at the outer side of the anchor plate, bolts fixed to the outer race ring and projecting through the anchor plate, and nuts accessible at the inner side of the anchor plate to provide for withdrawal of the drive shaft, bearing and bolts as a unit without disconnecting the anchor plate from the axle housing; substantially as described.

12. In a semi-floating axle construction, an axle housing having a flange, a drive shaft, an antifriction bearing beyond the end of the axle housing and having its inner race ring mounted on the shaft, a brake anchor plate alongside of the flange, means for securing the anchor plate to the flange, the outer race ring of the bearing being angular to provide a rigid holding flange alongside of the anchor plate, bolts secured to the race ring flange and projecting through the anchor plate and the housing flange, and nuts for rigidly clamping said bolt-engaging parts together and removable to provide for withdrawal of the drive shaft, bearing and bolts as a unit without disconnecting the anchor plate from the housing flange; substantially as described.

FREDERICK G. HUGHES.